United States Patent
Frederick et al.

(10) Patent No.: US 10,251,247 B2
(45) Date of Patent: Apr. 2, 2019

(54) SMART MESH LIGHT SOCKET

(71) Applicant: Sirqul, Inc., Seattle, WA (US)

(72) Inventors: Robert Frederick, Seattle, WA (US);
John Schleppy, Seattle, WA (US);
Russell Brian Dodds, Seattle, WA
(US); Thang Le, Seattle, WA (US);
Justin Jaewook Yu, Bellevue, WA
(US); Luis Cifuentes, Seattle, WA (US)

(73) Assignee: Sirqul, Inc., Seattle, WA (US)

( * ) Notice: Subject to any disclaimer, the term of this patent is extended or adjusted under 35 U.S.C. 154(b) by 16 days.

(21) Appl. No.: 15/861,524

(22) Filed: Jan. 3, 2018

(65) Prior Publication Data
US 2018/0192500 A1  Jul. 5, 2018

Related U.S. Application Data

(60) Provisional application No. 62/442,279, filed on Jan. 4, 2017.

(51) Int. Cl.
*H05B 37/02* (2006.01)
*H04L 12/28* (2006.01)
*H04W 84/18* (2009.01)

(52) U.S. Cl.
CPC ....... *H05B 37/0272* (2013.01); *H04L 12/282* (2013.01); *H04L 12/2827* (2013.01); *H04W 84/18* (2013.01); *H04L 2012/2841* (2013.01); *Y02B 20/48* (2013.01)

(58) Field of Classification Search
None
See application file for complete search history.

(56) References Cited

U.S. PATENT DOCUMENTS

| | | | | |
|---|---|---|---|---|
| 9,504,099 | B2 * | 11/2016 | McGuire | H05B 33/08 |
| 2009/0230894 | A1 * | 9/2009 | De Goederen | H05B 37/0272 315/314 |
| 2013/0293112 | A1 * | 11/2013 | Reed | H05B 33/0863 315/131 |
| 2015/0189726 | A1 * | 7/2015 | Spira | H05B 33/0845 315/302 |
| 2015/0366039 | A1 * | 12/2015 | Noori | H05B 37/0272 315/307 |

(Continued)

*Primary Examiner* — Minh D A
*Assistant Examiner* — James H Cho
(74) *Attorney, Agent, or Firm* — VLP Law Group LLP; James A. D. White

(57) ABSTRACT

Techniques are described for providing a smart-mesh socket. The smart-mesh socket may be sized and shaped to be engaged with any convention light socket to provide power to one or more circuits housed within the smart-mesh socket. These circuits may include, for example, a main circuit that includes at least a dual processor for controlling the operation and communications of at least two communication circuits. The dual processors may execute instructions for an operating system, thus allowing the smart-mesh socket to provide enhanced capabilities for networked devices. The first communication circuit may include a transceiver that allows the first communication circuit to send and receive communications with other devices over a wireless network. The second communication circuit may include a passive receiver that allows the second communication circuit to track and monitor devices as those device move through a smart-mesh network.

30 Claims, 5 Drawing Sheets

(56) References Cited

U.S. PATENT DOCUMENTS

2016/0105021 A1\* 4/2016 Murray ................ G02B 6/3817
  385/75
2017/0238401 A1\* 8/2017 Sadwick ............ H05B 37/0281
  315/294

\* cited by examiner

SMART MESH LIGHT SOCKET

CROSS-REFERENCE TO RELATED APPLICATIONS

This application claims the benefit of U.S. Provisional Patent Application No. 62/442,279, filed Jan. 4, 2017 and entitled "Smart Mesh Light Socket," which is hereby incorporated by reference in its entirety.

TECHNICAL FIELD

This disclosure generally relates to technology for providing a mesh network of intelligent, connected devices.

BACKGROUND

Techniques for interconnecting devices via wireless transmissions are increasingly popular, such as to link smart phones and other mobile devices. However, difficulties exist in interconnecting at least some types of devices in at least some environments, such as within buildings with multiple rooms. Such difficulties prevent various benefits that may be available from such interconnections of devices.

DETAILED DESCRIPTION

Techniques and devices are described for connecting multiple devices and providing resulting functionality, such as for providing a mesh network of connected devices. In at least some embodiments, the devices include enhanced sockets (e.g., light bulb sockets) that include wireless transmission capabilities (e.g., one or more wireless transceivers and/or receivers) and computing capabilities (e.g., one or more processing units, one or more memories with stored software instructions, etc.), such as to allow multiple such enhanced sockets in one or more buildings or other locations to interact with each other, including in some embodiments to form an inter-connected mesh network that is used to provide functionality of one or more types in a distributed manner based at least in part on communications or other interactions between multiple enhanced sockets and/or other devices that are part of the mesh network. Such enhanced sockets are generally referred to as a "smart-mesh socket" herein, and interconnections between such enhanced sockets are generally referred to as a "smart-mesh network" herein, with example embodiments of such enhanced sockets and mesh networks included below. In addition, while such a mesh network of enhanced sockets may provide various beneficial capabilities, as discussed below, such a mesh network may further connect to and interact with other devices external to the mesh network (e.g., mobile devices of users, smart wireless devices in a home or other building, etc.) and perform additional related functionality in at least some embodiments. Additional details related to such devices and techniques are included below.

Figure 1:
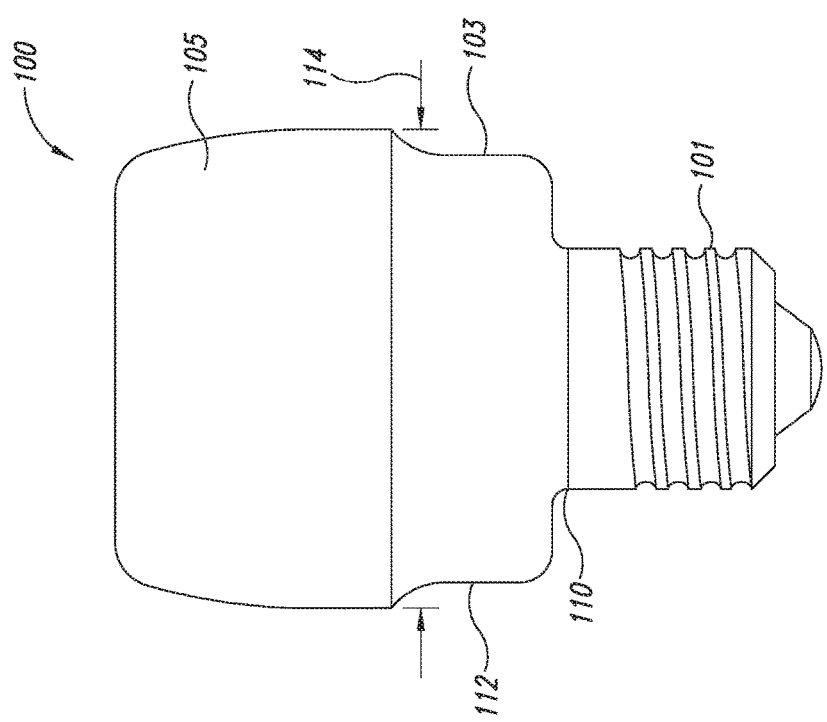
FIG. 1 illustrates an example of a smart-mesh socket, according to one illustrated implementation.

FIG. 1 illustrates an example of a smart-mesh socket 100, according to one illustrated implementation. The smart-mesh socket 100 illustrated in FIG. 1 is fully assembled, and includes a bottom cap 101, a lower case 103, and a top case 105. The bottom cap 101 is sized and shaped in this example embodiment to be engaged with a light bulb socket having an Edison-style screw base. For example, bottom cap 101 may be sized and shaped to be engaged in an E26/E27 standard base, an E39/E40 mogul base, an E14 base, or any other type of Edison-style screw base. In some alternative implementations, the bottom cap 101 may be sized and shaped to be engaged in some other electrical socket used for light bulbs, such as a bayonet style socket or a bi-post socket. In some implementations, the bottom cap 101 may be sized and shaped to be engaged with some other type of electrical outlet, such as a wall socket. The bottom cap 101 is comprised of material capable of conducting electricity from the light bulb socket, and providing the electricity to one or more circuits and/or light fixtures within or electrically coupled to the smart-mesh socket 100, as described below.

Lower case 103 and top case 105 are sized and shaped to enclose one or more circuits or circuit boards, including one or more circuit boards that are used to provide wireless communication capabilities to the smart-mesh socket 100, as discussed below. In addition, the circuit boards enclosed by the lower case 103 and the top case 105 may also include one or more circuit boards on which are mounted one or more processors (e.g., CPUs) or other processing units that can be used to control the functioning of the smart-mesh socket 100, including communications to and/or from the socket 100, also as discussed below. The lower case 103 has a base portion 110 that is sized and shaped to fit into the bottom cap 101 and an enclosure portion 112, that is opposite the base portion 110 and that contains the one or more circuit boards. The enclosure portion 112 flanges radially outward from the base portion 110 and away from the bottom cap 101 such that the enclosure portion 112 has a larger radius than the base portion 110. In some implementations, for example, the enclosure portion 112 of the lower case 103 may have a diameter 114 of about 54 mm. This larger area in the enclosure portion 112 may be used, for example, to completely or partially enclose the one or more circuits or circuit boards used by the smart-mesh socket 100. The lower case 103 may be comprised of a light-weight, non-conductive material that provides protection for the circuits or circuit boards enclosed within. For example, the lower case 103 may be comprised of a molded plastic piece. In some implementations, the lower case 103 may be comprised of materials processed using 3-D printing technology. In addition, while not illustrated in this example, the lower case 103 may in some embodiments include one or more holes or other apertures, such as to allow air flow to provide cooling to the circuit(s) or circuit board(s) enclosed within.

The top case 105 is sized and shaped to engage with the enclosure portion 112 of the lower case 103, thereby enclosing the one or more circuits or circuit boards used in the smart-mesh socket 100. When assembled, the total height 116 of the smart-mesh socket 100 from the bottom of the bottom cap 101 to the top of the top case 105 is about 79 mm. The top case 105 may have a substantially hollow center region that is sized and shaped to house a light bulb socket that receives a connector end for a light bulb. The top case 105 may be comprised of a light-weight, non-conductive material that provides protection for the circuits or circuit boards enclosed within. For example, the top case 105 may be comprised of a molded plastic piece. In some implementations, the top case 105 may be comprised of materials processed using 3-D printing technology. In some implementations, the color of the top case 105 may be used to visually indicate that a light socket has been adapted with a smart-mesh socket 100. For example, the top case 105 may be colored bright orange or red to provide a visual indicator that a smart-mesh socket 100 has been coupled to an ordinary light socket. In addition, different colors may be used to indicate different versions or capabilities of various types of smart-mesh sockets 100. The ability to visually determine the capabilities and layout of a smart-mesh network comprising multiple smart-mesh sockets 100 may be useful, for example, in big box stores with raised ceilings in which light sockets may be located 30 or 40 or more feet high, by allowing managers or users to identify smart-mesh sockets 100 and potentially determine the layout of the mesh network, all from the ground floor. In addition, while not illustrated in this example, the top case 105 may in some embodiments include one or more holes or other apertures, such as to allow air flow to provide cooling to the circuit(s) or circuit board(s) enclosed within.

Figure 2A:
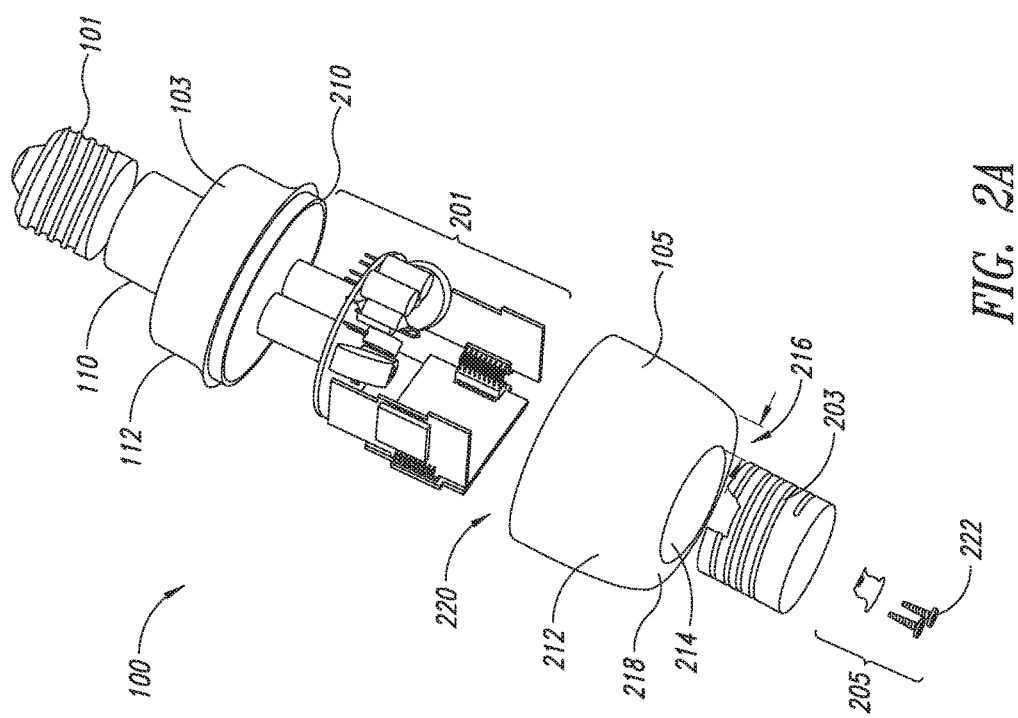
FIG. 2A is an exploded view showing components of a smart-mesh socket that includes Edison-style light bulb socket connectors, according to one illustrated implementation.

FIG. 2A is an exploded view showing the components of the smart-mesh socket 100, according to one illustrated implementation. The smart-mesh socket 100 includes a bottom cap 101, a lower case 103, a smart-mesh circuit 201, a top case 105, a top socket 203, and a center spring assembly 205. As shown in FIG. 2A, the base portion 110 of the lower case 103 is sized and shaped to fit into the bottom cap 101. The enclosure portion 112 of the lower case 103 receives the smart-mesh circuit 201. As shown in FIG. 2A, a portion of the smart-mesh circuit 201 may extend into the base portion 110 of the lower case 103 towards the bottom cap 101. In some implementations, this portion of the smart-mesh circuit 201 may be electrically coupled to one or more electrical connectors within the bottom cap 101 and be used to provide electricity to the smart-mesh circuit 201 when the smart-mesh socket 101 is engaged and electrically coupled with a light socket or other electrical outlet. The lower case 103 may include a lip 210 that is used to engage with the top case 105, thereby enclosing the smart-mesh circuit 201.

The top case 105 may be substantially annular in shape with an outside face 212 and an inside face 214 separated by a distance 216. In some implementations, the area between the outside face 212 and the inside face 214 may be substantially hollow, thus forming a recessed region within the top case 105. Such an implementation may advantageously reduce the weight and the material cost of the smart-mesh socket 100. The top case 105 may also have a top end 218 and a bottom end 220 that are substantially perpendicular to the outside face 212 and the inside face 214. As shown in FIG. 2A, the top end 218 may be solid and comprised of the same material as the outside face 212 and/or the inside face 214. In some implementations, the top end 218 may be substantially curved and form an arc when connecting two opposing points on the outside face 212 and the inside face 214. In some implementations, the bottom end 220 (not shown in FIG. 2A) may provide an opening to the recessed region formed between the outside face 212 and the inside face 214. Accordingly, at least some portion of the smart-mesh circuit 201 may extend up into and be housed within the recessed region between the outside face 212 and the inside face 214 of the top case 105. Using this recessed space allows the smart-mesh socket to be relatively smaller and more compact, and thus occupy less volume or space, than if this recessed space went unused. The opening in the bottom end 220 may be used to encompass the lip 210 on the lower case 103 such that the lip 210 fits between the outside face 212 and the inside face 214 of the top case 105 when the top case 105 is engaged with the lower case 103. Advantageously, engaging the lip 210 between the outside face 212 and the inside face 214 of the top case 105 may protect the smart-mesh circuit 201 from intrusion by environmental elements, such as moisture, dust, or other particles, that could interfere with the operation of the smart-mesh circuit 201.

As shown in FIG. 2A, the inside face 214 of the top case 105 has a radius that is sized and shaped to securely fit the top socket 203. The top socket 203 is used to engage a light bulb having an Edison shaped connector. The top socket 203 can also provide a grounded connection for the light bulb. In addition, the top case 105 may have one or more registration features to attach the center spring assembly 205. For example, the center spring assembly 205 may be attached to the top socket 203 using one or more screws 222 that are engaged with complementary threaded registration features (e.g., nuts) in the top case 105. The center spring assembly 205 may be used to provide a live or high connection for a light bulb screwed into the top socket 203. The top case 105 may alternatively be sized and shaped to be engaged with a different type of electrical socket, such as a bayonet-style socket or a bi-post style socket, instead of an Edison-style socket represented by top socket 203 and center spring assembly 205. In some implementations, the top case 105 may include a different style socket than that which is used to engage the bottom cap 101. For example, in some implementations, the bottom cap 101 may be an Edison-style connector while the top case 105 may be engaged with a bayonet style socket. Thus, in such implementations, the smart-mesh socket 100 may serve as an adapter or converter between various types or styles of light sockets.

Figure 2B:
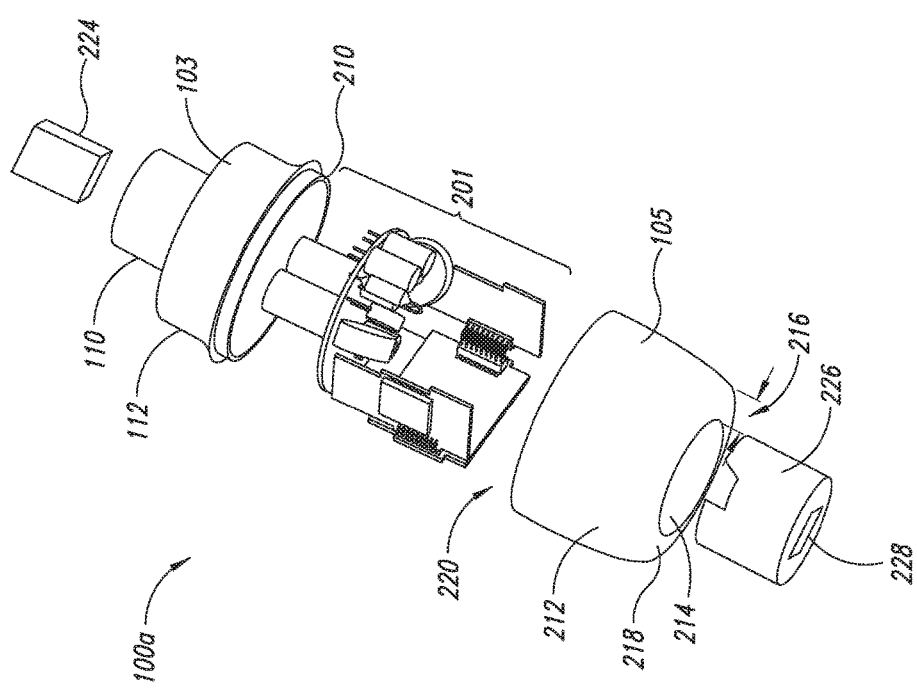
FIG. 2B is an exploded view showing components of a smart-mesh socket that includes Universal Serial Bus ("USB") style connectors, according to one illustrated implementation.

FIG. 2B shows a smart-mesh socket 100a that includes Universal Serial Bus ("USB") style connectors, according to one illustrated implementation. As such, the smart-mesh socket 100a may include the lower case 103, the smart-mesh circuit 201, and the top case 105, as discussed above with the smart-mesh socket 100. The smart-mesh socket 100a may include a first connector 224 that is located proximate the base portion 110 of the lower case 103. In some implementations, the first connector 224 may be a USB plug (e.g., a male style connector) at least a portion of which extends outward from the base portion 110 of the lower case 103 along a central axis that extends from a central portion of the top case 105 through the lower case 103. The exposed portion of the first connector 224 that extends outward from the base portion 110 of the lower case 103 may be sufficient to securely insert the smart-mesh socket 100a into a USB receptacle. In some implementations, the first connector 224 may be a USB receptacle (e.g., a female style connector). In such an implementation, the first connector 224 may be contained entirely within the base portion 110 of the lower case 103.

The smart-mesh socket 100a may include an insert 226 that has a second connector 228. In some implementations, the second connector 228 may be a USB receptacle that receives a corresponding USB plug—in such implementations, the entire second connector 228 may be contained within the insert 226. In some implementations, the second connector 228 may be a USB plug, at least a portion of which may be exposed—in such an implementation, the exposed portion of the USB plug may extend outward from the insert 226 along a central axis that extends from the lower case 103 through a central portion of the top case 105. In some implementations, the smart-mesh socket 100a may not include an insert 226, but instead, the top portion of the top case 105 may include a surface that includes the second connector 228. In embodiments in which the first connector 224 and the second connector 228 are both USB connectors, they may be of the same type (e.g., both "female" receptacles, both "male" plugs, etc.) or of different types (e.g., one "female" receptacle and one "male" plug), such as with either end of the socket 100a able to have either type in at least some embodiments). Although the first connector 224 and the second connector 228 are shown as USB connectors, other types of electrical and/or communication connectors may be used to electrically couple the smart-mesh socket 100a to other devices.

In such implementations, the smart-mesh socket 100a may be modularized, such that one or more different types of electrical couplers may be used to electrically couple the smart-mesh socket 100a. For example, in some implementations one or both of the insert 226 and/or the base portion 110 of the lower case 103 may be detachably coupled to the top case 105 and the lower case 103, respectively. As such, different types of electrical connectors may be selectively, physically coupled to each of the top case 105 and/or the lower case 103. For example, as shown in FIG. 2A, Edison-style connectors may be selectively, physically coupled to the top case 105 and the lower case 103 such that the smart-mesh socket 100 may be inserted into an Edison-style light socket. As shown in FIG. 2B, USB-style connectors may instead be selectively, physically coupled to the top case 105 and the lower case 103 such that the smart-mesh socket 100a may be inserted into a USB connector. In addition, in some embodiments, different types of electrical couplers may be used for the top case and the lower case, such as to use a lower case Edison-style connector to attach to an existing light bulb socket for power (or a lower case two-prong or three-prong style connector to attach to a wall electrical outlet or other electrical outlet for power), and to use an upper case USB-style connector to provide power to one or more USB devices. Thus, other types of electrical connectors may be used to electrically couple the smart-mesh socket 100a to a power source.

Figure 3:
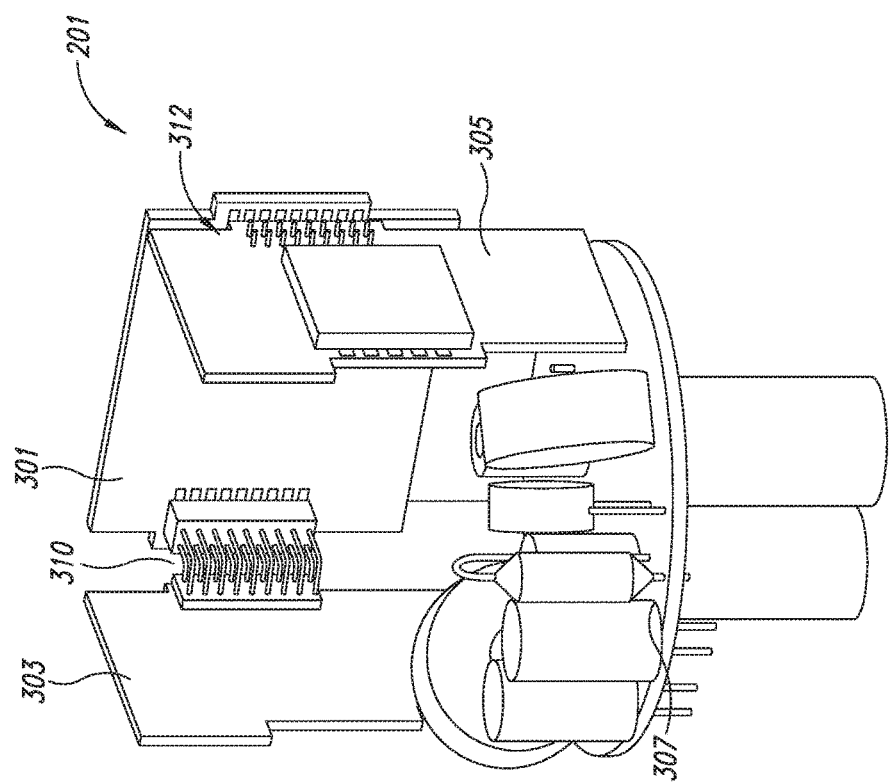
FIG. 3 is an illustration of a smart-mesh circuit, according to one illustrated implementation.

FIG. 3 is a diagram of the smart-mesh circuit 201, according to one illustrated implementation. The smart-mesh circuit 201 includes a main circuit 301, a first wireless circuit 303, a second wireless circuit 305, and a power circuit 307. In some implementations, the various circuits are arranged to reduce the overall size and footprint of the smart-mesh socket 100. For example, the main circuit 301, the first wireless circuit 303, and the second wireless circuit 305 may be electrically coupled to the power circuit 307 such that the circuit boards for the main circuit 301, the first wireless circuit 303, and the second wireless circuit 305 are each perpendicular to the circuit board for the power circuit 307. Further, the circuit board for the main circuit 301 may be perpendicular to the circuit boards for each of the first wireless circuit 303 and the second wireless circuit 305. The first wireless circuit 303 and the second wireless circuit 305 may be electrically and communicatively coupled to the main circuit 301 using one or more electrical connectors that form 90° angles, such as first connector 310 and second connector 312. As noted earlier, such an arrangement of the various circuit boards allows for one or more of the circuit boards for the main circuit 301, the first wireless circuit 303, and the second wireless circuit 305 to be housed within the recessed area formed between the outside face 212 and the inside face 214 of the top case 105 when the smart-mesh socket 100 is fully assembled.

Figure 4:
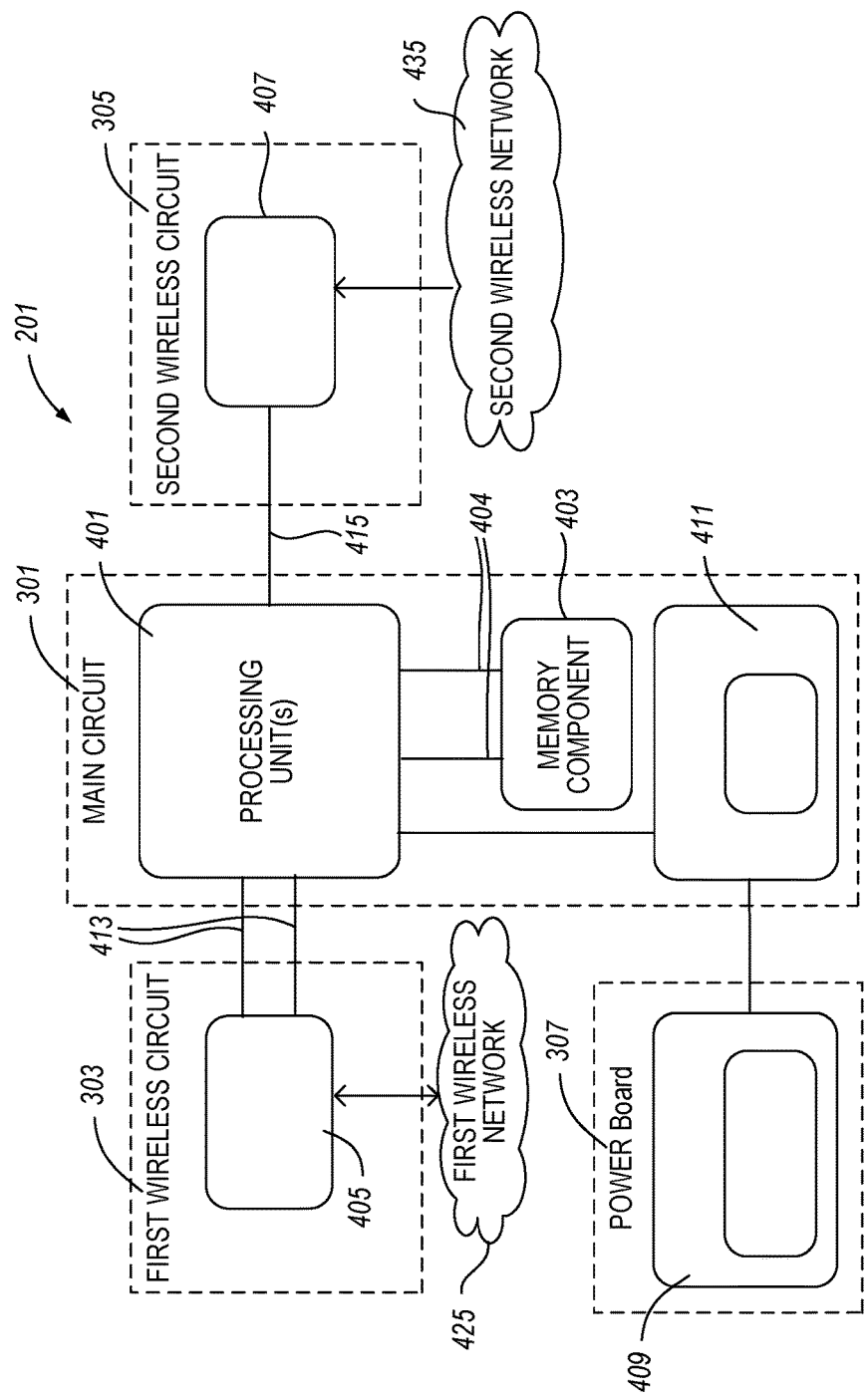
FIG. 4 is a block diagram showing components of a smart-mesh circuit, according to one illustrated implementation.

FIG. 4 is a block diagram showing components of the smart-mesh circuit 201, according to one illustrated implementation. The main circuit 301 includes one or more processing units 401 that control the operation and communications of the smart-mesh socket 100. The processing unit(s) 401 may be any logic processing unit, such as one or more central processing units (CPUs), digital signal processors (DSPs), application-specific integrated circuits (ASICs), field programmable gate arrays (FPGAs), etc. In some implementations, the processing unit 401 may include dual processors providing, for example, one processor to execute instructions controlling the first wireless circuit 303 and a second processor to execute instructions controlling the second wireless circuit 305. The main circuit 301 may include one or more memory components 403, such as non-transitory computer-readable or processor-readable media. The memory component 403 may include one or more nonvolatile memories such as read only memory (ROM) or FLASH memory and/or one or more volatile memories such as random access memory (RAM). In some implementations, the memory component 403 is a multi-chip package ("MCP") that is mounted onto the board for the main circuit 301. Such an MCP may be used to integrate multiple memory components into a single substrate that is then electrically and communicatively coupled to the board for the main circuit 301. For example, in some implementations, an MCP can include a low power double data rate synchronous DRAM (e.g., 1 GB LPDDR3) and an embedded Multi-Media Controller (e.g., 8 GB eMMC) that contains both flash memory and a flash memory controller. The MCP may also be referred to as a multi-chip module ("MCM") or a hybrid integrated circuit. The memory component 403 may further include various types of MCPs or MCMs, such as an MCM-L (laminated MCM), an MCM-D (deposited MCM), an MCM-C (ceramic substrate MCM), and a chip-stack MCM. The memory component 403 may be communicatively coupled to the processing unit 401 using one or more busses 404. The busses 404 may include one more parallel or serial connections capable of high speed communications such as, for example, a PCI (Peripheral Component Interconnect) bus, a PCI-E (PCI Express) bus, an ISA (Industry Standard Architecture) bus, an LPC (Low Pin Count) bus, or a USB (Universal Serial Bus) bus. In some implementations, the memory component 403 and the processing unit 401 may be communicatively coupled using a serializer-deserializer (SERDES) interface, such as may be used by Serial Port Memory Technology (SPMT).

In some implementations, the memory component 403 stores operating system software program(s) that can be executed by the processing unit 401 to implement one or more operating systems, and optionally may store one or more additional software programs to be executed by the operating system(s). For example, an implemented operating system may be a version of the Android® operating system, the Arduino Real Time Operating System (ARTOS), the Linux operating system or other UNIX-based operating system, the Java virtual machine or other Java-based operating system, or any other type of communications device operating system (e.g., iOS®, Windows® Phone, Windows® 8, or similar). Furthermore, additional software programs may, for example, include one or more application or app software programs that were designed to be executed on a mobile device (optionally with a GUI, or graphical user interface) but that are executed on the smart-mesh socket in the background, one or more application software programs that perform communications with other smart-mesh sockets and/or other devices to perform one or more of the types of functionality discussed herein, etc. In some embodiments, the additional software programs on some or all smart-mesh sockets include a mobile app that interacts with other smart-mesh sockets and/or other devices to perform functionality such as providing and managing user alerts, I/O (input/output) displays, workflows that include thresholds to be satisfied based upon data sensed by one or more smart-mesh sockets in the smart-mesh network, etc.—in at least some such embodiments, the mobile app and/or other additional software program may provide some or all functionality of a Distributed Functionality Provider (DFP) system (e.g., to manage interactions of multiple devices in one or more manners) and/or some or all functionality of a Location-based Task-Game (LTG) system (e.g., to manage interactions between different devices and their users in one or manners, including to exchange information, coordinate the performance of tasks, etc.), optionally based on interactions with one or more remote servers external to a location of a smart-mesh network (e.g., a building in which the smart-mesh network is located), and with further details about functionality of an example DFP system included in U.S. patent application Ser. No. 13/725,531 (now U.S. Pat. No. 9,071,603), filed Dec. 21, 2012 and entitled "Distributed Functionality On Mobile Devices", and with further details about functionality of example LTG systems included in U.S. patent application Ser. No. 13/843,804, filed Mar. 15, 2013 and entitled "Location-Based Task And Game Functionality" and in U.S. patent application Ser. No. 14/498,767, filed Sep. 26, 2014 and entitled "Location-Based Task And Game Functionality" and in U.S. patent application Ser. No. 15/809,882, filed Nov. 10, 2017 and entitled "Controlling Distributed Device Operations". Some or all such operating system software programs and/or additional software programs may, for example, be downloaded to one or more smart-mesh sockets from one or more remote servers, such as remote servers that aggregate information and/or functionality for various devices, such as to provide personalized services or other functionality to particular users (e.g., as part of a marketplace in which various users have accounts to which user-specific information and/or functionality is associated)—in embodiments in which such remote server(s) are used, they may further in at least some embodiments provide one or more databases or other storage capabilities used by smart-mesh sockets, as discussed in greater detail elsewhere herein. It will be appreciated that providing and using an operating system and optionally one or more additional software programs with a smart-mesh socket allows the smart-mesh socket 100 to provide intelligent functionality directed not only towards light bulbs engaged in the top socket 203, but also towards other wireless devices communicatively coupled to one or more of the wireless circuits 303 and 305, as well as to allow dynamic changes to operation during use by changing the software programs to be executed. In such implementations, this intelligent functionality may be pushed out and provided by devices, such as the smart-mesh sockets 100, located at the edge of the mesh network.

For example, in embodiments in which multiple smart-mesh sockets 100 are used in a retail store, the operating system and additional software programs (if any) may allow the various smart-mesh sockets 100 to track customers throughout the store based on monitoring transmissions from each customer's mobile devices. The data gained from tracking customers may allow the store operator to, for example, generate heat maps related to customer movements throughout the store, or identify relationships between various products located throughout the store. The operating system may also allow the store operator to use the smart-mesh sockets 100 to deploy one or more geo-fences throughout the store. Such geo-fences may be used to provide alerts, notifications, coupons, or other communications out to mobile devices that enter and/or leave the geo-fenced region.

As another example, in embodiments in which multiple smart-mesh sockets 100 are used in a building with multiple rooms (e.g., an office building, apartment or condominium building, hotel, mall or other group of retail stores, etc.), the operating system and additional software programs (if any) may allow the various smart-mesh sockets 100 to provide smart-building functionality of various types to the building, such as to monitor environmental conditions and/or occupancy (e.g., foot falls, dwell times, etc.) throughout the rooms, provide remote administration of operations of electrical devices in the various rooms (e.g., from a central control location within or external to the building, such as over an Internet connection from external computer systems to a mesh network of inter-connected sockets 100 within the building), implement energy conservation programs, track package deliveries, enable shared space reservations, etc.

Additional examples of functionality that multiple inter-connected devices (e.g., multiple sockets 100 and/or other client devices that wirelessly connect to one or more such sockets 100) may perform, including for a mesh network of multiple inter-connected devices, are included in U.S. patent application Ser. No. 13/725,531, filed Dec. 21, 2012 and entitled "Distributed Functionality On Mobile Devices," now U.S. Pat. No. 9,071,603, which is hereby incorporated by reference in its entirety.

The main circuit 301 includes a DC power component 411. In some implementations, the DC Power component 411 is a power management integrated circuit (PMIC) that can manage the power requirements for the smart-mesh circuit 201. In some implementations, the DC power component 411 may be used to provide DC-to-DC power conversion for one or more components within the smart-mesh circuit 201 or to regulate the power being supplied to the smart-mesh circuit 201. The DC power component 411 may be electrically coupled to the processing unit 401 using any appropriate power bus, such as I$^2$C bus technology.

As shown in FIG. 4, the first wireless circuit 303 within the smart-mesh circuit 201 may include a transceiver 405 that communicates with other devices through a local area network and/or a first wireless ad hoc network 425, such as those provided by technologies including Wi-Fi Direct®, Bluetooth®, NFC, 802.15)(ZigBee®), etc. In some implementations, the transceiver 405 may communicate using multiple communication protocols, such as Bluetooth and WiFi, and serve as a bridge allowing devices connected to the transceiver 405 using two different wireless protocols to communicate with each other. The first wireless circuit 303 may be communicatively coupled to the processor unit 401 using appropriate connections 413, which may be serial or parallel connections capable of high speed communications, such as via FireWire®, Universal Serial Bus® (USB) 2 or 3, Thunderbolt®, and/or Gigabyte Ethernet®. In some implementations, the connections 413 may use Secure Digital Input Output (SDIO) technology and/or (UART) technology to provide communication links between the first wireless circuit 303 and the processing unit 401.

The transceiver 405 allows the smart-mesh circuit 201 to send and receive data and communications with other devices. For example, the transceiver 405 may allow the smart-mesh circuit 201 to connect with other smart-mesh circuits 201 associated with other smart-mesh sockets 100 in order to form a mesh network. The mesh network may advantageously allow the components of the mesh network to communicate directly with one another and/or to provide seamless communications to a user's device as the user moves about a store or other building or location covered by the mesh network. Each of the smart-mesh circuits 201 deployed within a mesh network may act as a relay to pass data or communications generated within the mesh network to other devices also located within the mesh network or to other devices located outside of the mesh network. In some implementations, the transceiver 405 may be used to transmit advertisements, coupons, or other information to user devices within range of the transceiver 405. The transceiver 405 may also be used to receive communications and data from user devices. Such user devices may include, for example, one or more of: an iPhone, an iPad, an iPod Touch, an Android OS ("operating system") device, a Windows Phone OS device, a Kindle Fire device, a Nook Tablet device, a Blackberry device, a Nintendo OS device, a portable Sony PlayStation device, etc. The transceiver 405 also allows a network operator to push over-the-air updates to the operating system and/or other software stored on the memory component 403, such as during ongoing operations while the smart-mesh circuit is in use, allowing the network to quickly, easily, and efficiently push updates to the software on each of the smart-mesh circuits 201 within a mesh network.

The second wireless circuit 305 within the smart-mesh circuit 201 may include a passive receiver 407 that monitors devices that have wireless capabilities and use second wireless network 435, such as devices that have Wi-Fi Direct®, Bluetooth®, NFC, 802.15 (ZigBee®), 3G wireless, 4G wireless, and similar technologies. The second wireless circuit 305 may be communicatively coupled to the processor unit 401 using appropriate connections 415, which may be serial or parallel connections capable of high speed communications, such as via FireWire®, Universal Serial Bus® (USB) 2 or 3, Thunderbolt®, and/or Gigabyte Ethernet®. In some implementations, the connections 415 may use Secure Digital Input Output (SDIO) technology and/or (UART) technology to provide communication links between the second wireless circuit 305 and the processing unit 401.

The passive receiver 407 allows the smart-mesh circuits 201 within a mesh network to track user devices as the devices move about the area covered by the mesh network. Such tracking may occur in instances when the user is not actively using their device to send a communication, such as by placing a telephone call or transmitting text message on a wireless device. For example, a mobile device that has enabled wireless capabilities (e.g., WiFi or Bluetooth) may periodically transmit a wireless MAC address so that the device can be detected by nearby wireless sensors and potentially connect to a wireless network. In these cases, the passive receiver 407 may detect the transmission of the wireless MAC address as the device moves about the mesh network created by the smart-mesh circuits 201. Further, because the wireless MAC address in some cases does not change, the tracking data collected from the various smart-mesh circuits 201 can be aggregated, such as by a database or other storage that is communicatively coupled to one or more of the smart-mesh circuits 201 (e.g., a distributed database or other distributed storage coupled to each smart-mesh circuit, a non-distributed database or other non-distributed storage coupled to one or more smart-mesh circuits to which other smart-mesh circuits forward information for the database, a database or other storage on one or more remote servers at a location separated from the smart-mesh socket(s) and/or smart-mesh network by one or more intervening computer networks, etc.), to show the movements of a particular wireless device throughout the mesh network. Such tracking and aggregation of data can be performed in real-time in some implementations. The use of multiple smart-mesh circuits 201 within a mesh network allows for a highly precise determination of a device's location using known methods, such as, for example, a triangulation method based on signal strength. Accordingly, using a second wireless circuit 305 with a passive receiver 407 within the smart-mesh socket 100, in addition to the transceiver 405, allows for additional functionality (e.g., tracking, monitoring, etc.) that may not be possible with conventional devices that include just one wireless component that serves either as a transceiver or as a transmitter/beacon. In addition, the unique wireless MAC addresses can be used by a database or other storage to track a user's activities over time and across multiple different visits to the mesh network over a period of days, weeks, or even years.

As shown in FIG. 4, the smart-mesh circuit 201 includes a power circuit 307. The power circuit 307 includes an AC power component 409 that receives AC power provided to the smart-mesh socket 100 at the bottom cap 101 and converts the AC power to DC power that can be used by the various components of the smart-mesh circuit 201. In some implementations, for example, the AC power component 409 includes a pulse width modulator ("PWM") that can be used to convert the incoming AC power to DC power that is provided to the DC power component 411. In some implementations, the AC power component 409 may also include the appropriate connections to provide AC power to operate a light bulb or other electrical device engaged with the smart-mesh socket 100.

The above description of illustrated embodiments and implementation, including what is described in the Abstract, is not intended to be exhaustive or to limit the embodiments or implementations to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to providing various types of mesh networks.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein can be performed with variations. For example, many of the methods may include additional acts, omit some acts, and/or perform acts in a different order than as illustrated or described.

In the description above, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and methods associated with graphical user interfaces, smartphones, technology for receiving and processing input received through a touchscreen display, closed-loop controllers used to control processing conditions, and wired and wireless communications protocols have not been shown or described in detail to avoid unnecessarily obscuring descriptions of the embodiments.

Unless the context requires otherwise, throughout the specification and claims, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

It will also be appreciated that identical reference numbers in the drawings identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Pat. No. 9,071,603, filed Dec. 21, 2012 and entitled "Distributed Display Functionality On Multiple Mobile Devices"; U.S. patent application Ser. No. 13/843,804, filed Mar. 15, 2013 and entitled "Location-Based Task And Game Functionality"; U.S. patent application Ser. No. 14/498,767, filed Sep. 26, 2014 and entitled "Location-Based Task And Game Functionality"; U.S. patent application Ser. No. 15/809,882, filed Nov. 10, 2017 and entitled "Controlling Distributed Device Operations"; U.S. patent application Ser. No. 14/719,161, filed May 21, 2015 and entitled "Providing Distributed Functionality Via Multiple Devices"; U.S. Provisional Patent Application No. 62/318,186, filed Apr. 4, 2016 and entitled "Functionality For Inter-Device Audio-Based Instructions"; International Publication No. WO 2013/148887, filed Mar. 27, 2013 and entitled "Location-Based Task And Game Functionality"; ROC (Taiwan) Patent Application No. 102111015, filed Mar. 27, 2013 and entitled "Location-Based Task And Game Functionality"; ROC (Taiwan) Patent Application No. 105101919, filed Jan. 21, 2016 and entitled "Computer-Implemented Method, Non-Transitory Computer-Readable Medium And Configured System"; and ROC (Taiwan) Patent Application No. 105140889, filed Dec. 9, 2016 and entitled "Computer-Implemented Method, Non-Transitory Computer-Readable Medium And Configured System"; all of which are incorporated herein by reference in their entirety. Aspects of the embodiments can be modified, if necessary, to employ systems, circuits and concepts of the various patents, applications and publications to provide yet further embodiments.

From the foregoing it will also be appreciated that, although specific embodiments have been described herein for purposes of illustration, various modifications may be made without deviating from the spirit and scope of the invention. Accordingly, the invention is not limited by the exemplary details. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A smart-mesh socket comprising:
   a bottom cap connector that is sized and shaped to be electrically coupled with a light-bulb socket;
   a smart-mesh circuit that is electrically coupled to the bottom cap connector and that includes:
      a main circuit with one or more processing units and one or more memory components;
      a first wireless circuit with a transceiver to connect to a first wireless network to send and receive communications with other devices connected to the first wireless network that include multiple other smart-mesh sockets located throughout a building; and
      a second wireless circuit with a passive receiver to monitor wireless transmissions on a second wireless network without sending transmissions on the second wireless network, including to identify mobile devices of users within an area that is a subset of the building and is covered by the second wireless network,
   wherein the one or more memory components store software instructions that, when executed by at least one of the one or more processing units, configure the smart-mesh socket to participate via the first wireless circuit in a mesh network having a plurality of smart-mesh sockets that include the smart-mesh socket and the multiple other smart-mesh sockets, to cause the plurality of smart-mesh sockets to provide functionality distributed across the plurality of smart-mesh sockets that includes tracking locations of the users via the mobile devices as the users move throughout the building into separate areas covered by respective smart-mesh sockets of the plurality of smart-mesh sockets; and
   a top socket, electrically coupled to the bottom cap connector, that is sized and shaped to receive and provide power to a light bulb.

2. The smart-mesh socket of claim 1 wherein the one or more processing units include a first processing unit to control sending and receiving of communications by the first wireless circuit and further include a separate second processing unit to control monitoring of wireless transmissions by the second wireless circuit, and wherein the one or more memory components store one or more software programs to be executed by the one or more processing units, the one or more software programs including the software instructions stored by the one or more memory components.

3. The smart-mesh socket of claim 2 wherein the one or more software programs include at least one of Android operating system software, ARTOS operating system software, Linux operating system software, or Java virtual machine software.

4. The smart-mesh socket of claim 3 wherein the one or more software programs further include at least one of an application software program that is designed for use on a mobile device and executes in a background on the smart-mesh socket, or an application software program installed from a server system that is part of an aggregation hub to store information for and provide functionality to multiple users in a personalized manner.

5. The smart-mesh socket of claim 1 further comprising a lower case and a top case, wherein the lower case and the top case fully enclose the smart-mesh circuit when the lower case is engaged with the top case.

6. The smart-mesh socket of claim 5 wherein the top case is annular in shape and includes a recessed area between an outside face and an opposing inside face, and wherein at least part of the smart-mesh circuit extends into the recessed area when the lower case is engaged with the top case.

7. The smart-mesh socket of claim 5 wherein the top case is comprised of a plastic that has a color indicating one or more characteristics of the smart-mesh socket.

8. The smart-mesh socket of claim 1 wherein the bottom cap connector is sized and shaped to fit into a light bulb socket of a first type, and wherein the top socket is a second type of light bulb socket that is different from the first type of light bulb socket.

9. The smart-mesh socket of claim 8 wherein the first type of light bulb socket and the second type of light bulb socket are each selected from the group consisting of an Edison connector, a bayonet connector, and a bi-post connector.

10. A smart-mesh socket comprising:
    a bottom cap connector that is sized and shaped to be electrically coupled with a light-bulb socket;
    a smart-mesh circuit that is electrically coupled to the bottom cap connector and that includes:
       a main circuit with one or more processing units and one or more memory components, wherein the one or more memory components store instructions of one or more software programs to be executed by the one or more processing units;
       a first wireless circuit with a transceiver to connect to a first wireless network to send and receive communications with other devices connected to the first wireless network; and
       a second wireless circuit with a receiver to monitor wireless transmissions on a second wireless network;
    a top socket, electrically coupled to the bottom cap connector, that is sized and shaped to receive and provide power to a light bulb; and
    a lower case and a top case, wherein the lower case and the top case fully enclose the smart-mesh circuit when the lower case is engaged with the top case, wherein the top case is comprised of a plastic that has a color indicating one or more characteristics of the smart-mesh socket, and wherein the one or more characteristics indicated by the color of the top case relate at least to the one or more software programs.

11. A system having a mesh network with a plurality of smart-mesh sockets, each smart-mesh socket within the plurality of smart-mesh sockets comprising:
    a bottom cap connector that is sized and shaped to be electrically coupled with a light-bulb socket;
    a smart-mesh circuit that is electrically coupled to the bottom cap connector and that includes:
       a main circuit with two or more processing units and one or more memory components;
       a first wireless circuit with a transceiver to connect to a first wireless network to, under control of a first processing unit of the two or more processing units, send and receive communications with other devices connected to the first wireless network; and a second wireless circuit with a passive receiver to, under control of a second processing unit of the two or more processing units, monitor wireless transmissions on a second wireless network without sending transmissions on the second wireless network;

wherein the one or more memory components store software instructions that, when executed by at least one of the two or more processing units, configure the smart-mesh socket to participate via the first wireless circuit in the mesh network with the plurality of smart-mesh sockets, to cause the plurality of smart-mesh sockets to provide functionality distributed across the plurality of smart-mesh sockets via interactions between the plurality of smart-mesh sockets; and a top socket, electrically coupled to the bottom cap connector, that is sized and shaped to receive and provide power to a light bulb.

12. The system of claim 11 wherein the providing of the functionality distributed across the plurality of smart-mesh sockets caused by the software instructions includes at least some of the plurality of smart-mesh sockets being configured to track a user device as the user device moves within separate areas covered by respective smart-mesh sockets of the mesh network.

13. The system of claim 12 wherein the mesh network is communicatively coupled to storage configured to aggregate data that is associated with the user device and received by the mesh network over a period of time.

14. The system of claim 11 wherein the transceiver of the first wireless circuit in at least one of the smart-mesh sockets is configured to transmit data to a user device located within an area covered by the mesh network and to receive data from the user device.

15. The system of claim 11 wherein the plurality of smart-mesh sockets are located within a building, and wherein the providing of the functionality distributed across the plurality of smart-mesh sockets caused by the software instructions includes at least some of the plurality of smart-mesh sockets being configured to at least one of monitor occupancy of the building or monitor environmental conditions of the building.

16. The system of claim 11 wherein the plurality of smart-mesh sockets cover a defined area, and wherein the providing of the functionality distributed across the plurality of smart-mesh sockets caused by the software instructions includes at least some of the plurality of smart-mesh sockets being configured to at least one of provide reservations for spaces within the defined area or provide one or more geo-fences for one or more spaces within the defined area or support administration of electrical devices within the defined area from one or more locations external to the defined area.

17. The system of claim 11 wherein at least some of the smart-mesh sockets within the mesh network are configured to update, using an over-the-air update, software stored on memory components of the at least some smart-mesh sockets.

18. The system of claim 11 wherein the providing of the functionality distributed across the plurality of smart-mesh sockets caused by the software instructions includes one or more of the plurality of smart-mesh sockets being further configured to perform automated operations including:

receiving information about capabilities of at least some of the plurality of smart-mesh sockets to each implement a specified type of operation;

sending, over the mesh network, and based at least in part on the capabilities of the at least some smart-mesh sockets, first instructions to the at least some smart-mesh sockets to implement the specified type of operation;

evaluating performance of each of the at least some smart-mesh sockets in implementing the specified type of operation, including scoring the performance of each of the at least some smart-mesh sockets according to one or more specified criteria;

selecting one or more smart-mesh sockets of the at least some smart-mesh sockets to implement additional operations of the specified type, wherein the selecting is based at least in part on the evaluated performance of the one or more smart-mesh sockets; and sending, based on the selecting, one or more second instructions to each of the one or more smart-mesh sockets to implement one or more of the additional operations of the specified type.

19. The system of claim 18 wherein the at least some smart-mesh sockets are each associated with a mechanical system and has capabilities to receive and implement instructions to modify operations of the associated mechanical system, wherein the specified type of operation manipulates an environment around the associated mechanical systems, and wherein the sending of the first instructions includes sending the first instructions to each of the at least some smart-mesh sockets to cause the smart-mesh socket to control the associated mechanical system to perform the specified type of operation.

20. The system of claim 19 wherein the mechanical systems associated with the at least some smart-mesh sockets are part of mobile devices each having one or more mechanical actuators to manipulate a surrounding environment, and wherein sending of the first instructions to a smart-mesh socket to perform the specified type of operation includes causing the smart-mesh socket to issue one or more commands to one of the mobile devices to use at least one mechanical actuator of the one mobile device to manipulate the surrounding environment to accomplish a task associated with the specified type of operation.

21. The system of claim 19 wherein the mechanical systems associated with the at least some smart-mesh sockets include environmental controls for an interior of a building, and wherein sending of the first instructions to a smart-mesh socket to perform the specified type of operation includes causing the smart-mesh socket to issue one or more commands to at least one environmental control to manipulate the environment within the interior of the building to accomplish a task associated with the specified type of operation.

22. The system of claim 18 wherein the at least some smart-mesh sockets are of multiple types and have different types of capabilities, and wherein the evaluating of the performance of a smart-mesh socket in implementing the specified type of operation includes evaluating use of capabilities of the smart-mesh device to accomplish a task associated with the specified type of operation.

23. The system of claim 18 wherein the automated operations further include, before the sending of the first instructions to the at least some smart-mesh sockets, selecting the at least some smart-mesh sockets by sending a query to the plurality of smart-mesh sockets to identify capabilities to implement the specified type of operation, receiving responses to the sent query, and selecting the at least some smart-mesh sockets based at least in part on the received responses.

24. The system of claim 18 wherein the receiving of the information involves receiving information about additional devices separate from the at least some smart-mesh sockets and each having capabilities to implement the specified type of operation, and wherein the automated operations further include, before the sending of the first instructions to the at least some smart-mesh sockets, selecting the at least some smart-mesh sockets by retrieving information about historical performance of the at least some smart-mesh sockets involving interactions with the additional devices and by using the retrieved information as part of the selecting of the at least some smart-mesh sockets.

25. The system of claim 24 wherein the selecting of the at least some smart-mesh sockets is further based in part on at least one of information about scheduled maintenance for the at least some smart-mesh sockets or the at least some smart-mesh sockets being in a specified geographical location or workload information indicating current loads of the at least some devices or past performance scores for at least some smart-mesh sockets or a priority of a specified task to be performed or a time by which performing of a specified task is to be completed or a group of inter-related tasks to be performed in a specified order.

26. The system of claim 18 wherein the providing of the functionality distributed across the plurality of smart-mesh sockets caused by the software instructions includes the at least some smart-mesh sockets being further configured to perform additional automated operations including at least:
    receiving, by one or more of the at least some smart-mesh sockets, the sent first instructions;
    implementing, by the one or more smart-mesh sockets, the specified type of operation; and
    providing, by at least one of the one or more smart-mesh sockets, information to one or more computing systems about the implementing of the specified type of operation.

27. The system of claim 26 wherein the implementing of the specified type of operation includes performing, by the one or more smart-mesh sockets, one or more tasks associated with the specified type of operation, and wherein the providing of the information is performed at least in part over at least one network connection between the one or more computing systems and one of the at least some smart-mesh sockets that is selected to act as a host device for a group including the at least some smart-mesh sockets.

28. The system of claim 27 wherein the one or more smart-mesh sockets configured to perform the automated operations is the one smart-mesh socket selected to act as the host device,
    wherein selecting of the one smart-mesh socket as the host device for the group is performed by the at least some smart-mesh sockets before the sending of the first instructions,
    wherein the additional automated operations further include selecting, by the at least some smart-mesh sockets, and during the performing of the one or more tasks after the at least one network connection becomes unavailable, a new host device for the group to manage further performing of the one or more tasks,
    and wherein the providing of the information to the one or more computing systems is performed at least in part over at least one additional network connection created between the one or more computing systems and the new host device.

29. A smart-mesh socket comprising:
    a bottom connector that is sized and shaped to be electrically coupled with a first corresponding electrical socket from which electrical power is received during operation;
    a smart-mesh circuit that is electrically coupled to the bottom connector and that includes:
        a main circuit with one or more processing units and one or more memory components;
        a first wireless circuit with a transceiver to connect to a first wireless network to send and receive communications with a plurality of other smart-mesh socket devices connected to the first wireless network; and
        a second wireless circuit with a passive receiver to monitor wireless transmissions on a second wireless network without sending transmissions on the second wireless network; and
    a top socket, electrically coupled to the bottom connector, that is sized and shaped to be electrically coupled with a second corresponding electrical socket to which electrical power is provided during operation,
    wherein the one or more memory components store software instructions that, when executed by at least one of the one or more processing units, configure the smart-mesh socket to participate via the first wireless circuit in a mesh network with the plurality of other smart-mesh socket devices, to cause the smart-mesh socket and the plurality of other smart-mesh socket devices to provide aggregated functionality via interactions between at least the plurality of other smart-mesh socket devices;
    wherein the smart-mesh circuit and the top socket are powered during operation by the electrical power received by the bottom connector from the first corresponding electrical socket, and
    wherein the bottom connector and the top socket are selectively detachable from the smart-mesh circuit.

30. The smart-mesh socket of claim 29 wherein at least one of the bottom connector and the top socket include a Universal Serial Bus connector.

* * * * *